AUTOMATIC RECORD SELECTING PHONOGRAPH

Filed Dec. 29, 1961 2 Sheets-Sheet 1

INVENTOR

WARREN E. MOODY

BY [signature]

ATTORNEY

AUTOMATIC RECORD SELECTING PHONOGRAPH

Filed Dec. 29, 1961 2 Sheets-Sheet 2

INVENTOR
WARREN E. MOODY
BY [signature]
ATTORNEY 3,236,525
Patented Feb. 22, 1966

3,236,525

AUTOMATIC RECORD SELECTING PHONOGRAPH

Warren E. Moody, 3508 Osborne Road, Greensboro, N.C.

Filed Dec. 29, 1961, Ser. No. 163,174
7 Claims. (Cl. 274—10)

This invention relates to a multiple record phonograph having an improved selecting apparatus for selecting a record for play.

The phonograph of this invention provides a simple, economical and rugged mechanism for selecting a record for play from a stack of records on a support while the selected record remains on the support, and utilizing a selector system which may be electrical in nature.

The records to be played are respectively supported on circular plates or trays which are stacked one on top of another on a stationary table. The trays are so constructed that they interlock at their peripheries so that rotation of the bottom tray while resting on the support, will cause rotation of all the trays and their supported records. A vertically movable spindle extending through the center openings in the trays and records is provided with coupling members for raising all the trays above the selected record to expose its upper surface for play. The level at which the coupling members are operated to engage a tray to raise the records above the selected one, is controlled by operation of one of a plurality of selector buttons, each of which is individual to a record in the stack and which controls a circuit for initiating vertical movement of the spindle for operating the coupling members at the proper level of the spindle. At the same time the pickup arm is raised from its lowermost position to the level of the selected record, under control of the individual selector button.

It is therefore an object of the invention to provide a remotely controlled selector system for initiating the projection of a spindle through a plurality of records stacked on a table and on which they are played, for splitting the stack to expose a selected record for play.

A further object of the invention is to provide an electrically operated selector system which is manually initiated to split a stack of records in order to expose a desired record for play and for positioning the pickup arm at the plane of the selected record.

These and other objects of the invention will become apparent as a description of the invention proceeds with reference to the drawings.

Figures 1, 2:
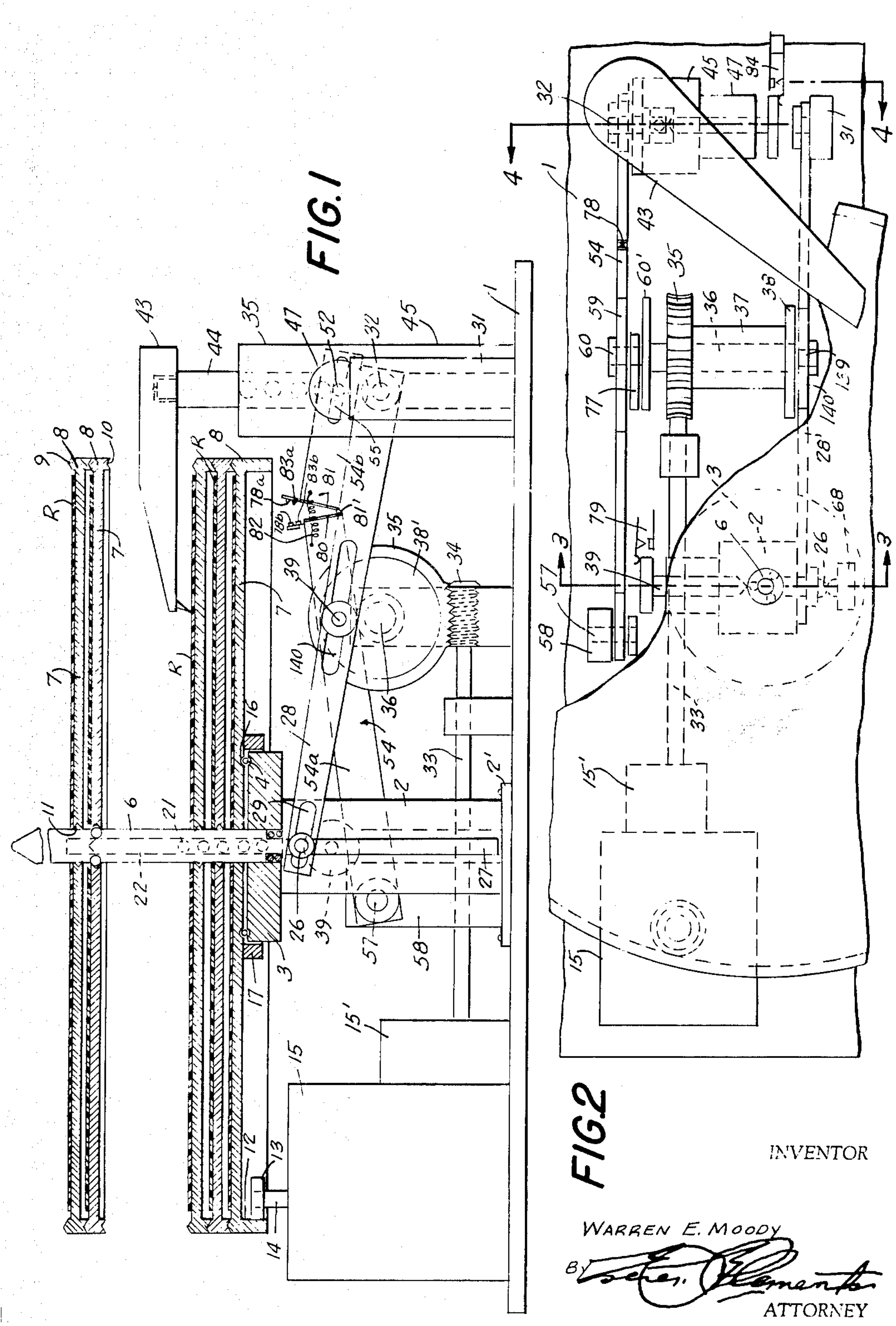
FIG. 1 is a front view of the phonograph with a stack of records split to expose a selected record, the record trays and records being in section.
FIG. 2 is a plan view of the phonograph with the record trays partly broken away.

With special reference to the figures of the drawing, the phonograph of this invention comprises a base 1 upon which is mounted a post 2, the lower end of the post having a radially extending circular flange 2' through which screws extend to secure the post to the base. The post is formed at its upper end with a radially extending circular table 3 concentric about the axis thereof. An annular concentric groove 4 is formed in the upper surface of the table, preferably adjacent to its outer periphery to form a lower raceway for the reception of ball bearings 5. The post is concentrically bored for the reception of a vertically slidably selector spindle 6 of such length as to extend upwardly from the table 3 even when it is in lowermost position as shown in FIG. 3.

Mounted on the upper surface of the table 3 is a stack of record carrier or record supporting tray members 7, resting one upon the other. The tray members may be in the form of flat plates of wood, metal or plastic each having an outer annular peripheral rim 8 secured thereto or formed integrally therewith. The rims are thicker than the trays in the axial direction and extend above and below the upper and lower surfaces respectively, of each of the trays. The upper surface 9 of each of the rims 8 tapers downwardly from an apex while the lower surface thereof is grooved as at 10, the taper of the groove walls being such as to permit the upper tapered surface of an adjacent lower rim to snugly nest therein. The upper and lower surfaces of the rims may be roughened or provided with a thin layer of friction material so that when in stacked relation on the table 3, rotation of the lower most tray will rotate all of the trays resting one upon the other at their rim portions. The central portions of each of the trays is provided with a concentric opening 11 of a diameter to slidably receive the spindle 6 when threaded therethrough. The surface of the wall of the central opening 11 in each of the trays, is formed with a concentric inwardly tapered groove surrounding the spindle 6. It is understood of course, that the term "record carriers" as used herein, may refer either to the records per se, which are the bodies of material on which the recording is made, or to such record bodies respectively mounted on or supported by a plate or tray, as shown in the drawings. Where the record bodies per se are utilized without a tray support, the walls of the central openings thereof may be grooved and the rims 8 may be separately formed ring members mounted on the peripheries of the records.

The lowermost tray, however, need not have the wall of its central opening grooved and the lower portion of its outer peripheral rim is extended downwardly a distance greater than the rims of the upper trays. The inner peripheral wall 12 of the rim of the lowermost tray forms a driving surface when in driving engagement with a friction roller 13 mounted on a shaft 14 of a record rotating motor 15 seated on the base 1. The lower surface of the bottom tray is formed with an annular concentric groove 16 in confronting relation with the groove 4 in the table 3 and forms an upper raceway for the ball bearings 5. Depending from the lower surface of the lowermost tray is an annular concentric wall 17 closely surrounding the table 3 for maintaining the lowermost record tray properly centered, in the event its central opening should wear excessively.

Figures 3, 4, 5:
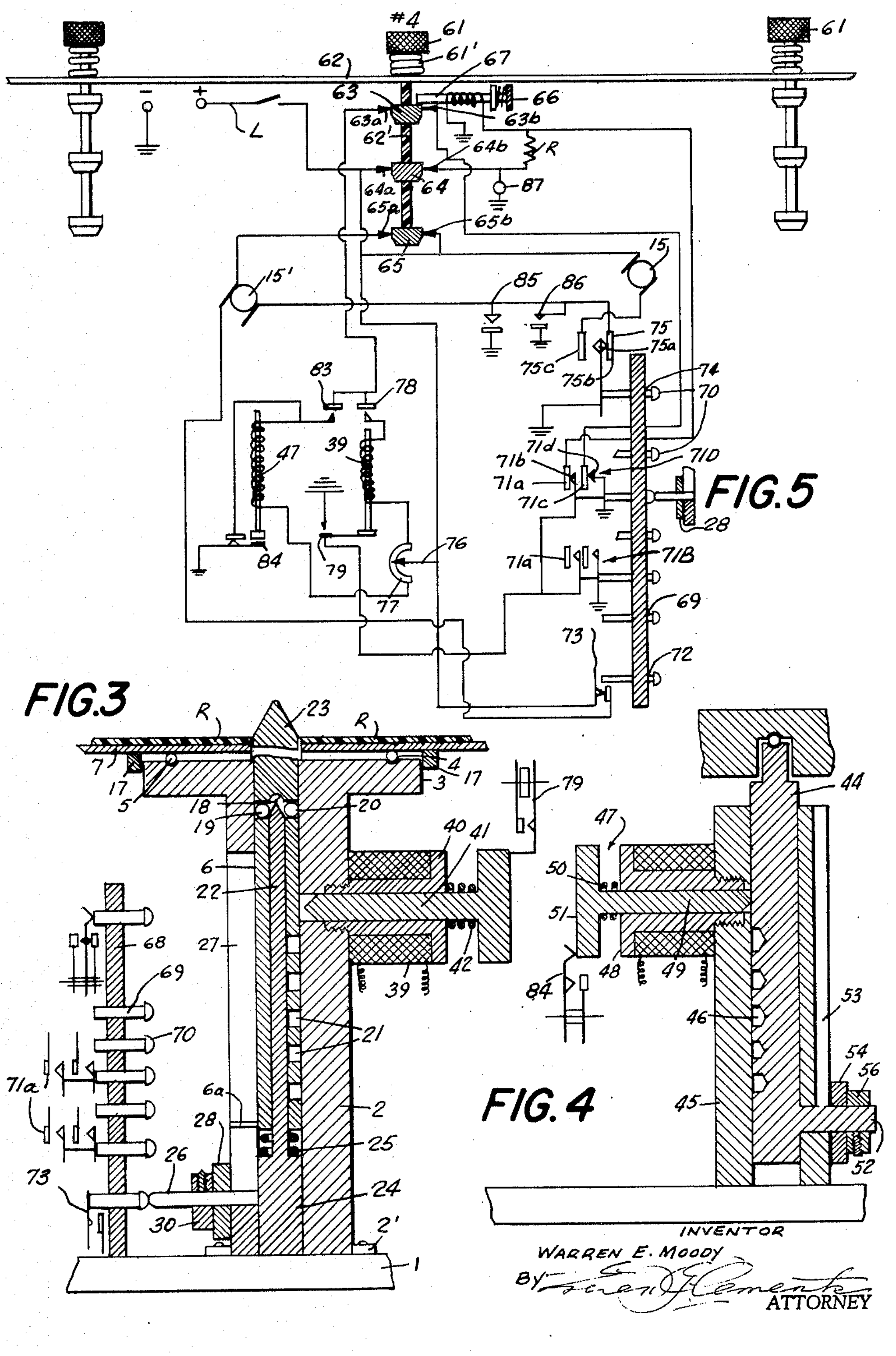
FIG. 3 is a vertical section along line 3—3 of FIG. 2 showing in addition the control selector rods positioned for engagement by the movable selector pin on the record selector spindle.
FIG. 4 is a vertical section along line 4—4 of FIG. 2.
FIG. 5 is a schematic of the circuit for controlling the record selection and the pickup arm level for the selected record.

The vertically slidable spindle 6 which extends through the central openings of the trays and the records supported thereby, is best shown in FIG. 3. The spindle 6, slidably mounted within the bore of the post 2 and table 3, is substantially cylindrical in shape and is itself provided with a longitudinally extending concentric bore 18 extending upwardly through its lower end. Intermediate the ends of the spindle are formed a plurality of radially directed circular openings 19, preferably three in number, the openings lying in the same horizontal plane and leading into the bore of the spindle for the respective reception of a spherical coupling member, such as a ball bearing 20. The diameters of the balls 20 and bore 18 of the spindle are such that the balls can move radially into the bore within the confines of the spindle without projecting radially outward thereof. The spindle 6 is also provided at its lower end portion with a plurality of vertically aligned radially directed opening 21 in its periphery which are equally vertically spaced from each other at a distance corresponding to the distance between the apices of the angular grooves formed in the central openings 11 in adjacent trays when their rim portions are resting one upon the other.

Slidably extending upwardly from the lower end of the selector spindle 6 and within the bore thereof is a vertically adjustable control member or rod 22 which is guided within the spindle. The upper end 23 of the control rod 22 is substantially cone shaped to provide a wedge between the inner surfaces of the coupling elements or balls 20 when the rod is moved upwardly within the spindle for projecting them outwardly through the openings 19. When the selector spindle 6 and control rod 22 are moved upwardly through the table 3 to align the openings 19 with a selected tray 7 of the stack, relative upward movement of the rod 22 causes the balls or coupling members 20 to be projected into the grooved central opening of the selected tray. When the spindle 6 and rod 22 are then again moved upwardly together, the selected tray together with all those resting thereon are raised to split the stack, the coupling members forming a support for the selected tray.

In order to provide such vertical movements of the spindle and rod, the rod 22 is formed at its lowermost end below the end of spindle 6 with an enlarged cylindrical boss 24 to slidably engage the wall of the spindle bore. The seat thus formed by the upper surface of the boss supports a coiled tension spring 25 surrounding the rod 22 and upon which the spindle 6 is supported. The spring 25 is of such strength that it may support the spindle without being unduly compressed by the weight thereof but is compressed by the weight of the spindle when at least one tray 7 is supported thereon by means of the coupling members 20. Extending radially from the boss 24 is a pin element 26 projecting through a slot 27 in the post 2. The slot 27 formed in the wall of the post extends vertically to permit the pin 26 to be guided therein as it is driven vertically to position the spindle with its openings 19 in alignment with a selected record tray 7.

The pin 26 is reciprocated vertically by means of a lever arm 28 having a longitudinally extending elongated slot 29 formed therein adjacent its free end and through which the pin 26 projects. The free end portion of the pin 26 may be provided with a collar 30 for maintaining the arm 28 on the pin. The arm 28 is pivoted at its other end on an upright post 31 by means of a horizontal pivot pin 32. A record selecting motor 15′ seated on base 1 drives a shaft 33 through a gearing arrangement, the free end of the shaft having a gear 34 thereon which meshes with a vertically arranged gear 35 secured to a shaft 36 mounted for rotation in a bearing member 37 secured to the base 1 and from both ends of which the shaft extends. To one end of the shaft 36 is secured a disc 38 to which is secured a horizontally extending pin 139 eccentrically arranged thereon, the pin 139 extending through an elongated slot 140 formed in the lever arm 28 intermediate the ends thereof. As the gear 35 rotates, the lever 28 will be raised and lowered about its pivot 32 to raise and lower the selector spindle 6 and control rod 22 through the central openings in the record trays 7 and records supported thereon.

In order to select a particular record to be played, it is necessary to raise all of the trays in the stack above the selected one to expose the desired record. In order to do so, the spindle 6 together with control rod 22 are raised to move through the central openings in the trays until the openings 19 in the spindle 6 are in the plane of the tray above the selected one. The upward movement of the spindle 6 is then momentarily terminated, the control rod is raised upwardly to project the balls or control members 20 radially outward into the groove of the central opening in the tray and upward movement of the spindle and control rod is continued to split the stack in order to provide sufficient space for the reproducing arm to move over the selected record which is uppermost on the lower portion of the stack. To this end, a selectively controlled member is provided for projection into the path of movement of the spindle to interrupt its upward movement at the proper time. The selectively controlled member comprises a solenoid 39 having a winding mounted on the post 2 by means of a nonmagnetic hollow bolt 40 extending through the winding and threaded into a radial opening in the post. The movable magnetic core 41 of the solenoid extends through the hollow bolt 40 and is moved radially inward of the post when the solenoid is energized. A spring 42 between the head of the bolt and a radially extending head on the core normally maintains the latter in its outward position when the winding is deenergized. The spindle 6 is also provided at its lower end with a radially projecting pin 6*a* which extends through the slot 27 for preventing rotation of the spindle to maintain the openings 21 in alignment with the core member 41.

A pickup arm 43 is mounted to one side of the stack of records and carries the usual pickup for movement over the uppermost record of the lower portion of the split stack for reproducing it. Since the level at which each selected record is reproduced is different, it is necessary to raise the pickup arm to the level of the selected record. The pickup arm may be pivotally supported on the upper end of a vertically movable post 44 for movement in both vertical and horizontal planes in the conventional manner. The post 44 is mounted for vertical sliding movement within the bore of a hollow column 45 extending uprightly from the base 1. The post 44 is provided with vertically aligned radial openings 46 which are spaced apart a distance corresponding to openings 21 in spindle 6. A solenoid 47 having a winding secured to the column 45 by means of a nonmagnetic bolt 48 extending therethrough into threaded engagement with the column, has a magnetic core member 49 slidable through the bolt and a registering radial opening in the column, whereby the end of the core may extend into a selected opening 46 in the post when such opening is aligned with the radial opening in the post when such opening is aligned with the radial opening in the column. A spring 50 between the head of the bolt and head 51 of the core normally maintains the core in its outward position when the winding is deenergized.

A pin 52 attached to or formed integrally with the post 44 adjacent to its lower end extends radially therefrom through a vertically extending slot 53 in the wall of the column 45. A lift arm 54 is mounted near one end on the pin 52 by means of an elongated slot 55 therein and is maintained on the pin by means of a collar 56 secured to the pin. The lift arm is pivotally supported at its other end by means of a horizontal pivot 57 on an upright 58 on the base 1. Intermediate of its ends, the arm 54 is provided with an elongated slot 59 through which extends a pin 60 eccentrically mounted on a disc 60′ secured for rotation with the shaft 36. In order to energize the solenoids 39 and 47 at the proper time during the upward travel of the spindle 6 and post 45 for interrupting such travel, a selecting circuit is provided which is prepared by manually operating a selected one of a plurality of switch buttons, the circuit being completed when the spindle and post have been raised to the desired level. The selector switch buttons, one of which is shown at 61 in FIG. 5, are mounted in a panel 62 together with indicia indicating which record of the stack corresponds to a respective button.

Each of the switch buttons 61 comprises an elongated shank 62' of insulating material mounted for sliding movement through the panel and supporting three spaced conductive members 63, 64 and 65 of frusto-conical shape secured to the shank 62'. At least one of the conductive portions such as 63 is enlarged to extend outwardly of the shank. A spring 61' coiled about the shank and interposed between the head of the button and the outer surface of the panel normally biases the button outwardly. Each of the conductive members or portions closes a circuit for first locking the button in its operative position, a second circuit for operating the motor 15' and the third circuit to one of a plurality of individual switching assemblies respectively mounted to be controlled at various levels by the pin 26 for energizing the solenoids. When a selected button 61 is pressed inwardly, contact member 64 bridges a pair of diametrically opposed spring contacts **64*a* and 64*b* to energize a solenoid 66. The core of the solenoid is projected upon energization of the latter toward the shank 62 of the button to engage behind the shoulder formed by the enlarged conductive portion 63** to maintain it in its inwardly pressed position.

A panel 68 extending upwardly from the base 1 and adjacent to the post 2 has a plurality of vertically spaced transverse openings therein for the reception of a plurality of slidable rods 69 having head portions 70 in the path of movement of the projecting end of the pin 26 on the spindle 6. The vertical spacing between the centers of the rods 69 is equal to the spacing between the centers of the openings in the spindle 21, the openings being so located on the panel 68 that when the pin 26 engages the head 70 of the lowermost rod 69 the uppermost opening 21 in the spindle 6 is below the inner end of the core 41 of solenoid 39 mounted on post 2.

Located on one side of the panel 68 is a vertical array of leaf spring switch assemblies 71A–71X depending on the number of record trays in the stack which is to be supported on the table 3. Each leaf spring assembly operates as a double-pole single-throw switch and is in the path of movement of a respective rod 69 for closing the normally open pairs of contacts **71*a*, 71*b* and 71*c*, 71*d* when the rod is moved by pin 26. The contact 71*a* of each of the switches 71A–71X is connected to one terminal of the winding of a respective solenoid 66 associated with a corresponding selector button. Contacts 71*b* of all the switches are connected in common to ground, contacts 71*c* are each respectively connected to a contact 63*b* positioned for engagement by each conductive portion 63 of a corresponding selector button 61, while contacts 71*d* are all connected to ground. A rod 72 similar to the rod 69 is mounted for sliding movement through panel 68 at the lower end thereof and its location corresponds to the lowermost position of the pin 26 of the selector rod 22 and spindle 6. A normally closed switch 73 is positioned in the path of movement of the rod 72 and is adapted to be opened by projection of the rod under the influence of pin 26. Similarly, a rod 74 is slidably mounted in the uppermost portion of the panel 68 to control the operation of a single-pole double-throw switch assembly 75, the common contact 75*a* of which normally engages contact 75*b* and is moved by the rod 74 when projected by pin 26 to open contacts 75*a* and 75*b* and close contacts 75*a* and 75*c*. The outer abutting end of the pin 26 and the head 70 on each of the rods have spherical surfaces so that the rods are cammed smoothly outward as the pin 26 successively engages the heads 70** during its vertical movement.

In the starting position with pin 26 in its lowermost position, the pin has pushed rod 72 to open the contacts of the normally closed switch 73 so that the circuit to the motors 15 and 15' is open. With specific reference to the operation of the selector circuit shown in FIG. 5 for selecting a record in the stack to be played, one of the selector buttons 61 corresponding to the selected record is depressed. Switch contacts **64*a*, 64*b* are bridged by conducting members 65 to energize hold-down solenoid 66 from line L through the switch contacts, through resistance R to the winding of solenoid 66 and to ground. The core 67 of the solenoid is projected behind the shoulder formed by the enlarged conductor portion 63 to maintain the button 61 depressed. Contacts 65*a*, 65*b* are bridged by conductive portion 65 to energize the selector drive motor 15' by a circuit extending from line L through contacts 65*a*, 65*b* through the motor and normally closed contacts 75*a*, 75*b* of switch 75 to ground. The selector pin 26 is thus moved vertically away from its lowermost position permitting the contacts of switch 73 to engage to form a parallel circuit for maintaning the motor 15'** in operation.

If the selector button 61, for example the one marked 4 for selecting the fourth record from the bottom of the stack has been depressed, the conductor portion 63 bridges contacts **63*a* and 63*b* to connect contact 71*c* of switches 71A–71X to one terminal of the solenoid 39 through switch 78, to be described later, in order to prepare a circuit for energizing the solenoid when the pin 26 reaches the fourth rod 69 from the bottom corresponding to the selected record. As the selector pin 26 is raised to finally reach the fourth lowermost selector rod 69 to project it to close the contacts of switch 71D, closure of contacts 71*c*, 71*d*, completes the circuit to selector solenoid 39 on post 2 to project its core 41 into the proper opening 21 in spindle 6. The circuit for energizing the solenoid 39 can be traced from line L, brush 76, arcuate contact 77, solenoid 39 through normally closed switch 78, bridge contacts 63*a*, 63*b* and contacts 71*c*, 71*d* to ground. The pickup arm post 44 is also raised by energization of motor 15' and simultaneously with energization of solenoid 39, the solenoid 47 on column 45 is energized to project its core into an opening 46 in the pickup arm supporting post 44, this opening being the fourth one from the lowermost end of the post. The upward travel of spindle 6 and pickup arm supporting post 44** is therefore interrupted.

Located adjacent to the outwardly enlarged end of the core 41 of the solenoid 39 is a normally closed switch 79 which is open when the core is in its outward position while the solenoid is deenergized. Upon energization of the solenoid the core 41 recedes from the switch 79 permitting it to close whereby the ungrounded terminal of the hold down solenoid 66 for the number 4 selector button and which is connected to the resistance R is grounded through contacts **71*a*, 71*b* of switch 71C to thus deenergize the solenoid 66 for releasing the previously selected button 61. The switches 71A–71X are so constructed that contacts 71*c* and 71*d* close before contacts 71*a*, 71*b***.

The arm 54 for raising the pickup arm post 44 is formed by two longitudinally extending sections **54*a* and 54*b*. The normally abutting ends of the sections are provided with respective cooperating hinge members 80 and 81 pivotally connected at their lower ends on a horizontal pivot 81' extending transversely to the arm 54. A spring 82 connected at its ends to the respective sections 54*a* and 54*b* normally maintains the sections in alignment. Carried by the arm sections adjacent to their abutting ends, are insulating members each carrying a pair of contacts, the respective contacts of each pair being in opposing relation. As shown, the contacts 78*a* and 78*b* provide the heretofore mentioned switch 78 and contacts 83*a*, 83*b* form the switch 83**.

As motor 15' remains energized to continue rotation of discs 38 and 61 even after the vertical movement of spindle 6 and post 44 are interrupted by their respective solenoids, the selector rod 22 continues to move upwardly in spindle 6, to compress the spring 25 and project the coupling members 20 outwardly against the wall of the central opening in a record tray with which they are in alignment and to thereafter continue vertical movement of the spindle 6. By reason of the sectional construction of the pickup lifting arm 54, the section 54*a* continues to be raised by the crankpin 60 thus causing the abutting ends of sections 54*a* and 54*b* to pivot away from each other about the pivot 81 against the bias of spring 82 to open the contacts of switches 78 and 83. Thus the solenoid 39 is deenergized by opening switch 78 to withdraw the core 41 from the opening 21 in the spindle 6 permitting both the spindle and control rod to continue to move upwardly, in order to raise all of the record trays above the third lowermost record in the stack. As the selector pin 26 on lift arm 28 approaches the uppermost limit rod 74 on the panel 68, the rod is cammed outwardly to break contacts 75*a* and 75*b* to deenergize the lift motor 15′ and to make contacts 75*a* and 75*c* in order to energize the motor 15 for rotating the record trays and records remaining on the table 3.

A normally closed switch 84 is located adjacent to the outer enlarged end of the core of pickup arm solenoid 47 which is opened by the core in its outward position but closed by inward movement of the core when the solenoid is energized, to control a holding circuit for maintaining energization thereof when switch 83, in series with the solenoid 47, is opened by breaking of its contacts located on the respective sections 54*a* and 54*b* of lifting arm 54. The core 51 of the solenoid 47 thus remains in the selected opening 46 of pickup arm post 44 to maintain the arm in position for playing the selected record.

At the end of record play, when the pickup is in the terminal groove of the record a normally open switch 85 may be provided, as is conventional in the art, for closure thereof by the pickup arm. Closure of switch 85 will thus cause the drive motor 15′ to be reenergized. Since the eccentrically mounted drive pins 39 and 60 on discs 38 and 61 are at their uppermost position, operation of the motor 15′ will immediately cause the pins to move arms 28 and 54 downwardly thus allowing the trays carried by spindle 6 to be lowered onto the trays supported on the table 3 and the pickup arm supporting post to be moved to its lowermost position. As the selector pin 26 moves the lower limit rod 72 outward, switch 73 is opened to deenergize the drive motor 15′.

The arcuate conducting member 77 is secured on the disc 60′ driven by shaft 36 and extends over an arc of 180°. The brush 76 is in the form of a stationary contact in engagement with the arcuate conducting member 77. The location of the latter on disc 60′ is such that as the pin 60 is moving in a direction to raise the arm 54, the brush and arcuate conducting member are in contact. As the disc is rotated to move the arm 54 downwardly, contact between the brush 76 and conducting member 77 is discontinued to permit the core 41 to move outwardly and open switch 84 to the holding circuit for the solenoid 47. Furthermore, interruption of contact between brush 76 and conducting member 77 will prevent the selector solenoid 39 from being energized when a selector button 61 is depressed during the lowering movement of selector arm 28.

To discontinue the playing of a selected record if desired, a manually operated switch 86 in parallel with the end-of-record switch 85 is provided, to cause a mechanism to remove the pickup from the record being played and to energize the drive motor 15′ to return the uppermost split portion of the stack of records to the stack on the table 3. A light 87 connected between each contact 64*b* and ground is provided and is energized while the selector button 61 corresponding to a desired selected record remains depressed to indicate which selection of records have been made.

While the end-of-play switch 85 has been shown as controlling energization of the record selection motor 15′, the switch may also be utilized for controlling energization of electrical or mechanical devices to raise the pickup arm from the record and return it to a position outwardly of the stack as the upper partial stack of records is being lowered. While no automatically operating mechanism has been described for moving the pickup from a position outwardly of the stack into engagement with the initial groove of the selected record after the stack has been split, it is evident that any of the well known prior art devices may be used for this purpose and coordinated for operation in timed relation with the mechanism of this invention to provide a completely automatic phonograph. The record selecting mechanism of this invention together with the selecting circuit for controlling same are simple in operation, economical to manufacture and have few moving parts which are subject to deterioration and wear.

Having thus described the invention, the principles of operation thereof and the best mode of utilizing such principles, obvious modifications may occur to one skilled in the art without departing from the scope and spirit of this invention as depicted by the appended claims.

What is claimed is:

1. A multiple record phonograph comprising a support member, a stack of record carriers having central openings therethrough, a table for supporting said stack, said table defining a longitudinal hollow portion therethrough concentric with said central openings, said table being mounted on said support member, a hollow spindle mounted in said hollow portion and movable axially through said opening and said hollow portion, a control rod axially movable within said spindle, and longer than said spindle, means supporting said spindle on said control rod and biasing said spindle relative to said control rod, means for moving said control rod axially through said openings thereby moving said spindle and said means supporting therewith, means responsive to a predetermined condition engaging said spindle to halt movement of said spindle with said control rod and provide movement of said control rod relative to said spindle and means responsive to movement of said control rod relative to said spindle for engaging a predetermined one of said record carriers.

2. A multiple record phonograph as set forth in claim 1 wherein said spindle forms at least one aperture therein and wherein said means responsive to movement of said control rod is a clutch means extending through said aperture formed in said spindle.

3. A multiple record phonograph as set forth in claim 2 wherein said movement of said control rod causes said control rod to extend through and beyond said spindle for engaging said clutch means.

4. In a multiple record phonograph as defined by claim 1 in which the means supporting comprises a resilient compressible member between the control rod and hollow spindle member.

5. A multiple record phonograph as defined by claim 1 including a pickup arm support movable by the means for moving said control rod moving means, a pickup arm mounted on the support, and a second stop means movable into engagement with the support for interrupting movement thereof to position the pickup arm substantially opposite the desired record carrier.

6. In a multiple record phonograph as defined by claim 1, a post member in fixed relation to the spindle member, the means responsive to a predetermined condition including a movable element on one of the members and a plurality of cooperating stop means on the other of the members engageable with the movable element and spaced from each other by a distance corresponding to that between the like sides of the record carriers in adjacent stack.

7. In a multiple record phonograph as defined by claim 6 in which the movable element is mounted on the fixed member and the cooperating means responsive to a predetermined condition is carried by the spindle member.

References Cited by the Examiner

UNITED STATES PATENTS

| | | | |
|---|---|---|---|
| 1,719,184 | 7/1929 | Koester et al. | 274—10 |
| 2,097,288 | 10/1937 | Mitchell | 274—10 |
| 2,132,993 | 10/1938 | Mitchell. | |
| 2,602,668 | 7/1952 | Finneran et al. | 274—14 X |
| 2,621,047 | 12/1952 | Carreau. | |
| 2,761,686 | 9/1956 | Stalling | 274—10 |

FOREIGN PATENTS

| | | |
|---|---|---|
| 1,161,173 | 3/1958 | France. |

LOUIS J. CAPOZI, *Primary Examiner.*

ALDRICH MEDBERY, *Examiner.*